United States Patent
Esquivel et al.

(10) Patent No.: US 11,568,164 B2
(45) Date of Patent: Jan. 31, 2023

(54) ENHANCED CONTACTLESS VEHICLE CODES

(71) Applicant: Ford Global Technologies, LLC, Dearborn, MI (US)

(72) Inventors: Juan Manuel Esquivel, Mexico City (MX); Jose Antonio Garcia, Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/317,790

(22) Filed: May 11, 2021

(65) Prior Publication Data

US 2022/0366165 A1   Nov. 17, 2022

(51) Int. Cl.
*G06K 7/14*    (2006.01)
*G06K 19/06*   (2006.01)
*G06K 7/10*    (2006.01)

(52) U.S. Cl.
CPC ....... *G06K 7/1417* (2013.01); *G06K 7/10425* (2013.01); *G06K 19/06009* (2013.01)

(58) Field of Classification Search
CPC ............. G06K 7/1417; G06K 7/10425; G06K 19/06009
See application file for complete search history.

(56) References Cited

U.S. PATENT DOCUMENTS

| 9,066,326 B2 | 6/2015 | Narayan et al. |
| 9,691,190 B2 | 6/2017 | Bae et al. |
| 2013/0035787 A1 | 2/2013 | Canter |
| 2013/0043306 A1* | 2/2013 | Acosta-Cazaubon ........................ B60L 53/30 235/382 |
| 2013/0317693 A1* | 11/2013 | Jefferies .............. B60R 25/2018 701/31.5 |
| 2018/0158255 A1* | 6/2018 | Garcia ..................... B60Q 1/52 |
| 2020/0151702 A1 | 5/2020 | Sinha et al. |

FOREIGN PATENT DOCUMENTS

| CA | 2298958 A1 | 1/2001 |
| CN | 103955733 B | 2/2017 |
| EP | 1918798 B1 | 3/2013 |
| EP | 3567503 A1 | 11/2019 |
| JP | 2009281889 A | 12/2009 |

(Continued)

OTHER PUBLICATIONS

Mercedes-Benz, "The Rescue Sticker From Mercedes-Benz", https://www.mercedes-benz.com/en/ehicles/passenger-cars/glb/leonie-von-hase-tests-the-new-glb/, 10 pages.

(Continued)

*Primary Examiner* — Matthew Mikels
(74) *Attorney, Agent, or Firm* — Brandon Hicks; Eversheds Sutherland (US) LLP

(57) ABSTRACT

Devices, systems, and methods for contactless vehicle codes are presented. A method may include receiving, by a vehicle, a first request to present a code associated with an activity. The method may include sending a second request to a device, the second request indicative of the activity. The method may include receiving, from the device, the code, wherein the code includes information associated with the activity. The method may include presenting, using a display of the vehicle, the code.

10 Claims, 10 Drawing Sheets

(56) References Cited

FOREIGN PATENT DOCUMENTS

| KR | 20180041995 | A  | 4/2018  |
|----|-------------|----|---------|
| KR | 101973589   | B1 | 8/2019  |
| KR | 102061252   | B1 | 12/2019 |
| MX | 2014001343  | A  | 10/2014 |
| WO | 02093509    | A1 | 11/2002 |
| WO | 2006126207  | A2 | 11/2006 |

OTHER PUBLICATIONS

Saumya Bhatia, "QR Code for Vehicle Verification: Make the Process Quick and Authentic", QR Batch Blog, Scanova.io, https://scanova.io/blog/QRbatch/Category/Bulk Generation, Apr. 17, 2020, 10 pages.

* cited by examiner

ENHANCED CONTACTLESS VEHICLE CODES

BACKGROUND

People increasingly demand contactless interaction for safety and convenience. However, some contactless interactions still require human proximity to other people or devices.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
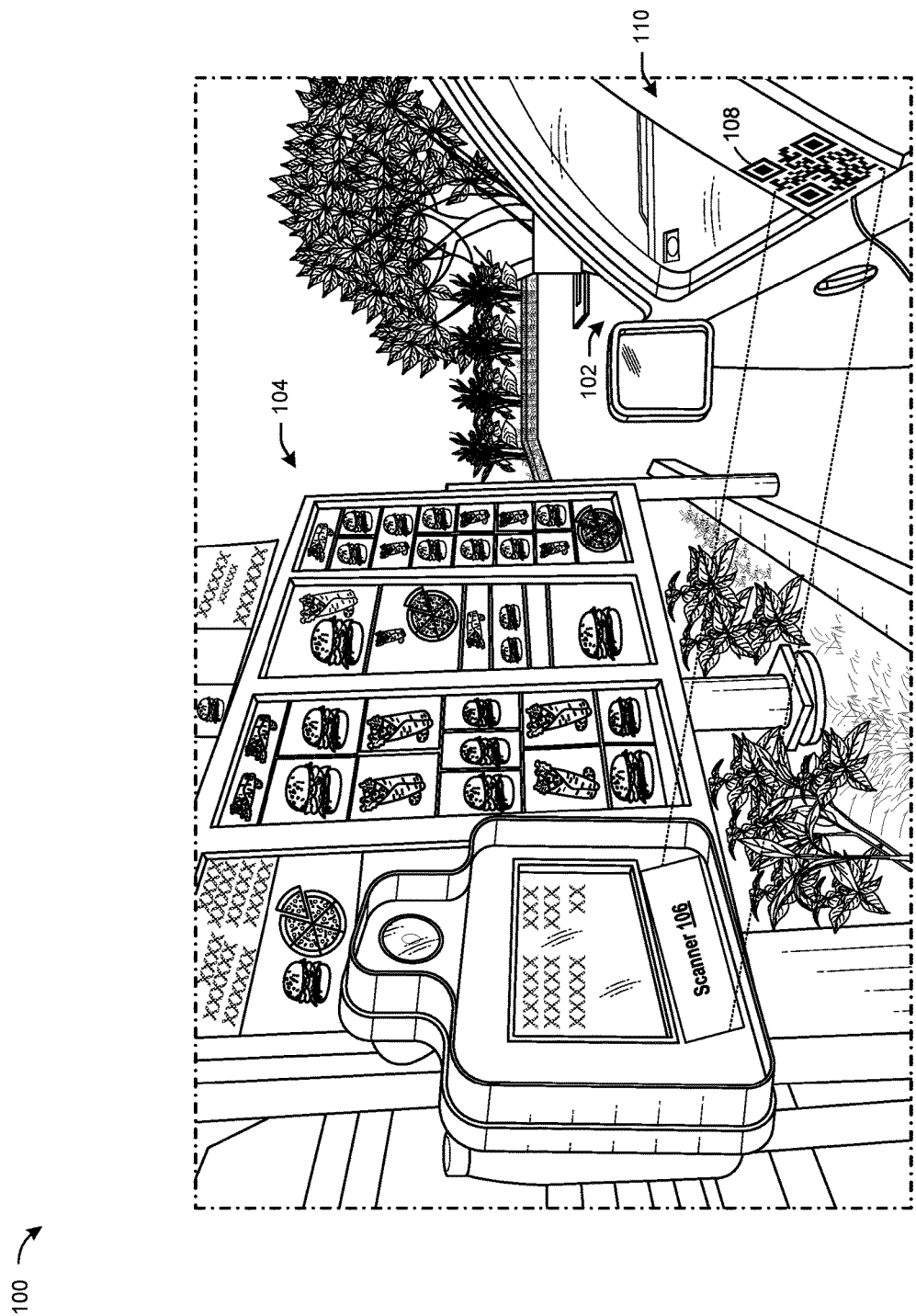
FIG. 1 depicts an illustrative vehicle code presentation system in which techniques and structures for providing the systems and methods disclosed herein may be implemented.

People increasingly want to avoid contact when conducting transactions, being pulled over by a vehicle, picking up items with a vehicle, ride sharing, and the like. While some contactless payment methods allow users to pre-pay or scan payment cards or tags, the existing methods may require too much time and/or proximity to people or devices.

For example, due to the COVID19 pandemic, many people may be afraid to be infected despite being inside their vehicles, and they put down their windows and have an interaction with other people or devices, such as drive-through pick-ups, parking stations, law enforcement, emergency responders (e.g., when a person is in a vehicle accident), and ride sharing (e.g., it may be difficult for a driver or rider to identify a vehicle or passenger).

Therefore, there is a need for enhanced contactless vehicle codes.

In one or more embodiments, vehicles may present codes that may be read by people and devices without requiring any human or device contact. For example, a vehicle may display quick response (QR) codes, near field communication (NFC) codes, ultrasonic codes, or the like (e.g., using a display on or built into a pillar, door, or the like of the vehicle). Based on a user selection of a type of code or activity (e.g., parking, law enforcement, drive-through, ride sharing, etc.), the vehicle may present a QR code with information relevant to the type of code or activity. For example, a law enforcement or emergency QR code may present information identifying a vehicle and/or person (e.g., based on a person's driver's license and/or vehicle registration). A parking QR code may present vehicle information (e.g., a license plate and/or vehicle identification number, payment information, etc.). A drive-through QR code may present transaction information (e.g., a purchase identifier or identifier of the purchaser). A ride share QR code may present information identifying a vehicle or person (e.g., a driver or passenger account). In this manner, a person or device (e.g., a device with QR scanning capabilities) may identify vehicle and/or person information without contact and without a person in the vehicle having to leave the vehicle or even put down a window.

In one or more embodiments, in accordance with relevant laws and with user consent, based on a user selection of a type of code or activity, the vehicle may present a corresponding QR code with the relevant information. For example, an in-vehicle infotainment system may allow a vehicle passenger to select the type of code or activity for which a QR code is to be presented using the vehicle (e.g., a display on a vehicle pillar, door, window, etc.). The vehicle may generate or receive the QR code. For example, user or vehicle information may be stored on the vehicle or in a centralized data storage (e.g., a cloud-based system). When the user selects a type of code or activity, the vehicle may request a QR code corresponding to the type of code or activity (e.g., the vehicle may send to the centralized system a QR code request with an indication of the type of code or activity). The centralized system may receive the vehicle QR code request, may identify the type of code or activity, may generate a corresponding QR code with the information relevant to the type of code or activity, and may send the QR code to the vehicle for presentation. In this manner, personal information may remain secure in the centralized system. Alternatively, the user or vehicle information may be stored on a mobile device (e.g., using an application of a mobile device). The mobile device may provide the information to the vehicle or centralized system for QR code generation, or may generate the QR code for the vehicle when the vehicle requests a QR code based on a user-selected type of code or activity.

In one or more embodiments, to further protect privacy and sensitive data, a QR code displayed by a vehicle may be displayed temporarily and/or the QR code presentation may be turned off at any time by a user. Respective QR codes may differ from one another (e.g., based on a time or transaction), thereby minimizing the likelihood of an attacker being able to identify QR-coded information. The vehicle may discard any QR code after use so that no QR code or its information may be found on the vehicle after temporary presentation of the QR code.

Illustrative Embodiments

Turning now to the drawings, FIG. 1 depicts an illustrative vehicle code presentation system 100 in which techniques and structures for providing the systems and methods disclosed herein may be implemented.

Referring to FIG. 1, the vehicle code presentation system 100 includes a vehicle 102 driving through a drive-through 104 (e.g., a fast food restaurant, a shopping pick-up location, etc.) that may have a code scanner 106 capable of reading QR codes, NFC codes, ultrasonic codes, and the like. The vehicle 102 may present a code 108 (e.g., a QR code, NFC code, ultrasonic code, and the like) using a vehicle display (e.g., on a vehicle pillar 108 as shown).

In one or more embodiments, the code 108 may include information about the vehicle 102, the driver, a transaction, or the like. For example the code 108 may be a drive-through code (e.g., indicative of a drive-through activity) and may present transaction information (e.g., a purchase identifier or identifier of the purchaser). When the code scanner 106 scans the code 108, the information coded in the code 108 may be identified, allowing a person or device to identify a transaction, which items are being purchased/picked up, the purchaser (when appropriate), and the like. In this manner, the code 108 may allow for a transaction (e.g., interaction) to occur without the driver needing to make contact with anyone outside of the vehicle 102. For example, a purchaser may pre-pay for items and, when driving through the drive-through 104, the vehicle 102 may display the code 108 to allow for the transaction to be identified automatically and securely.

Figure 2:
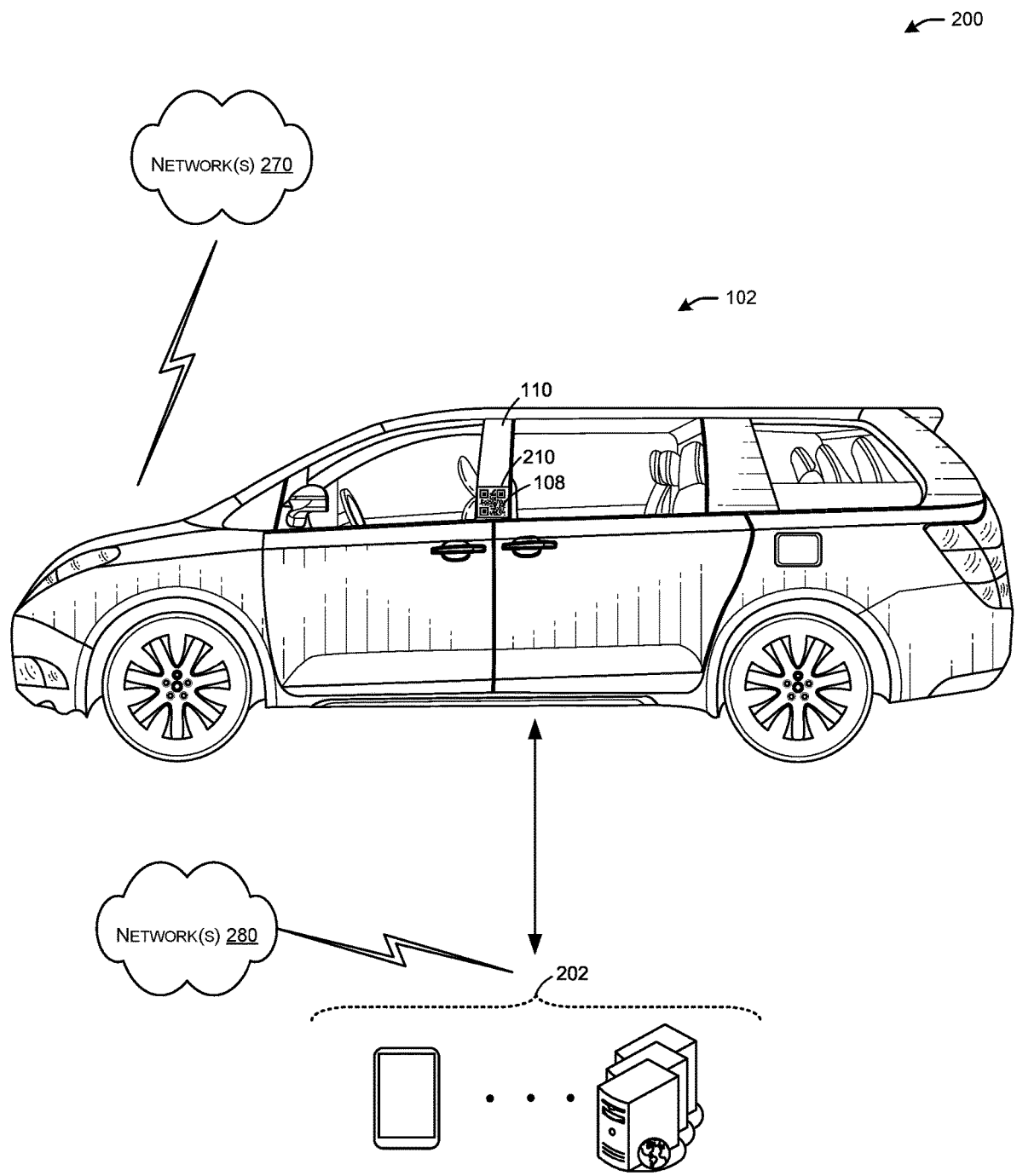
FIG. 2 depicts a system for generating and presenting vehicle codes.
Figure 6:
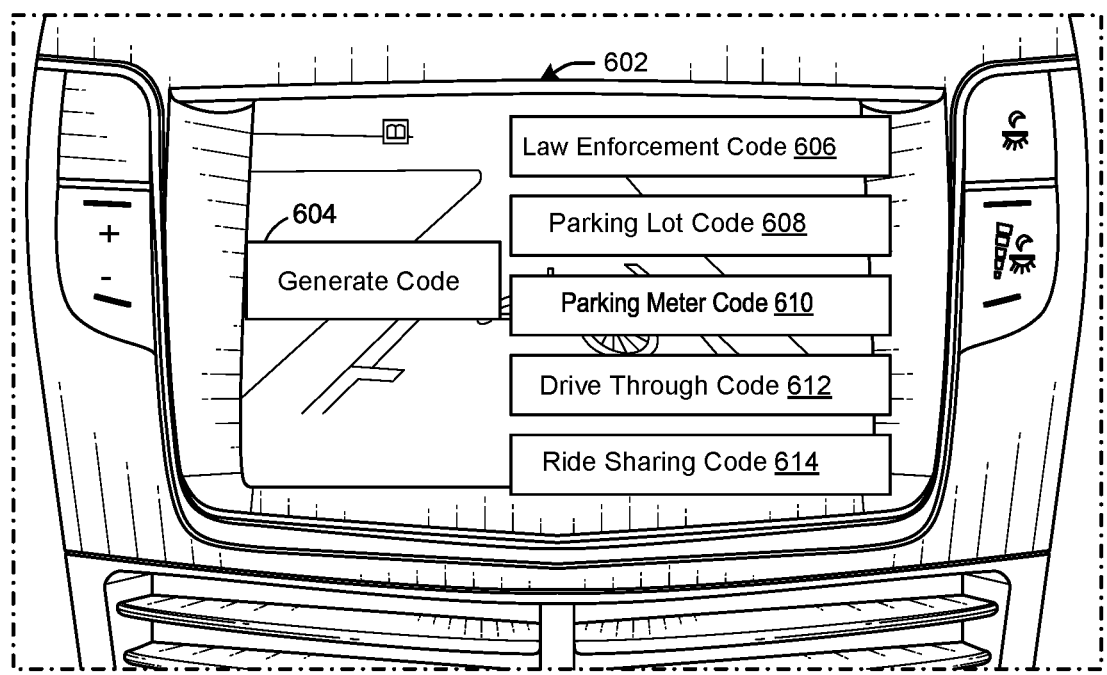
FIG. 6 depicts an illustrative vehicle code selection system.

In one or more embodiments, after the code scanner 106 scans the code 108 and identifies the transaction, if the payment for the transaction has not yet been made, then the vehicle 102 may display (e.g., using a display 602 as shown in FIG. 6) the price of the items purchased, and may present an option for a user to authorize an automatic payment (e.g., using payment information stored in one or more devices 202 of FIG. 2), thereby allowing for contactless payment.

FIG. 2 depicts a system 200 for generating and presenting vehicle codes.

Referring to FIG. 2, the system includes the vehicle 102 of FIG. 1 capable of displaying the code 108 using a portion of the vehicle 102 (e.g., the pillar 108 as shown, or any other exterior or interior portion of the vehicle 102). The vehicle 102 may communicate with one or more devices 202 to generate the code 108. For example, the vehicle 102 may request a code 108 based on a type of activity (e.g., a drive-through/pick-up activity, a law enforcement stop, a ride sharing activity, a parking activity, or the like). The vehicle 102 may send a request to the one or more devices 202 indicating the activity, and the one or more devices 202 may generate the code 108 based on the activity. The one or more devices 202 may send the code 108 to the vehicle 102 for presentation. The vehicle 102 may include a display 210 with which to present the code 108.

In one or more embodiments, user or vehicle information may be stored on the vehicle 102 or in the one or more devices 202. When a user (e.g., driver or passenger of the vehicle 102) selects a type of code or activity, the vehicle 102 may request a code corresponding to the type of code or activity (e.g., the vehicle 102 may send to the one or more devices 202 a code request with an indication of the type of code or activity). The one or more devices 202 may receive the vehicle code request, may identify the type of code or activity, may generate the code 108 with the information relevant to the type of code or activity, and may send the code 108 to the vehicle 102 for presentation. In this manner, personal information may remain secure in the one or more devices 202.

In one or more embodiments, to further protect privacy and sensitive data, the code 108 displayed by the vehicle 102 may be displayed temporarily and/or the code 108 presentation may be turned off at any time by a user. Respective codes may differ from one another (e.g., based on a time or transaction), thereby minimizing the likelihood of an attacker being able to identify QR-coded information. The vehicle 102 may discard any code after use so that no code or its information may be found on the vehicle after temporary presentation of the code 108.

In one or more embodiments, the information in the code 108 may be based on the code type or activity type. For example, a law enforcement or emergency code may present information identifying a vehicle and/or person (e.g., based on a person's driver's license and/or vehicle registration). A parking code may present vehicle information (e.g., a license plate and/or vehicle identification number, payment information, etc.). A drive-through code may present transaction information (e.g., a purchase identifier or identifier of the purchaser). A ride share code may present information identifying a vehicle or person (e.g., a driver or passenger account). In this manner, a person or device (e.g., the code scanner 106 of FIG. 1) may identify vehicle and/or person information without contact and without a person in the vehicle 102 having to leave the vehicle 102 or even put down a window.

In one or more embodiments, a user or a device (e.g., a mobile application executing on the one or more devices 202) may provide vehicle information (e.g., license plate, VIN, vehicle registration, etc.), user information (e.g., name, address, driver's license number, health information, demographic information, etc.), user account information (e.g., account number, payment information, etc.), payment information (e.g., credit card account, bank account, etc.), transaction information (e.g., transaction identifier, purchase information, etc.) to the one or more devices 202 for secure storage, and to allow the one or more devices 202 to generate the code 108 without the vehicle 102 storing any personal or otherwise sensitive information. For example, a user may upload a picture of a driver's license and/or any of the information included in a driver's license. A mobile application with which a user purchases items (e.g., corresponding to FIG. 1) may send the transaction information to the one or more devices 202 to use in generating the code 108, or the one or more devices 202 may execute the mobile application and generate the code 108 in response to a transaction, a ride share request, or the like. To determine the information to include in a code, the one or more devices may map the type of activity included in the request from the vehicle 102 to stored information, and may use the stored information to generate the code.

In one or more embodiments, the vehicle 102 and/or the one or more devices 202 may include a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

Any of the vehicle 102 and/or the one or more devices 202 may be configured to communicate with each other via one or more communications networks 270 and/or 280 wirelessly or wired. Any of the communications networks 270 and/or 280 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 270 and/or 280 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 270 and/or 280 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 3:
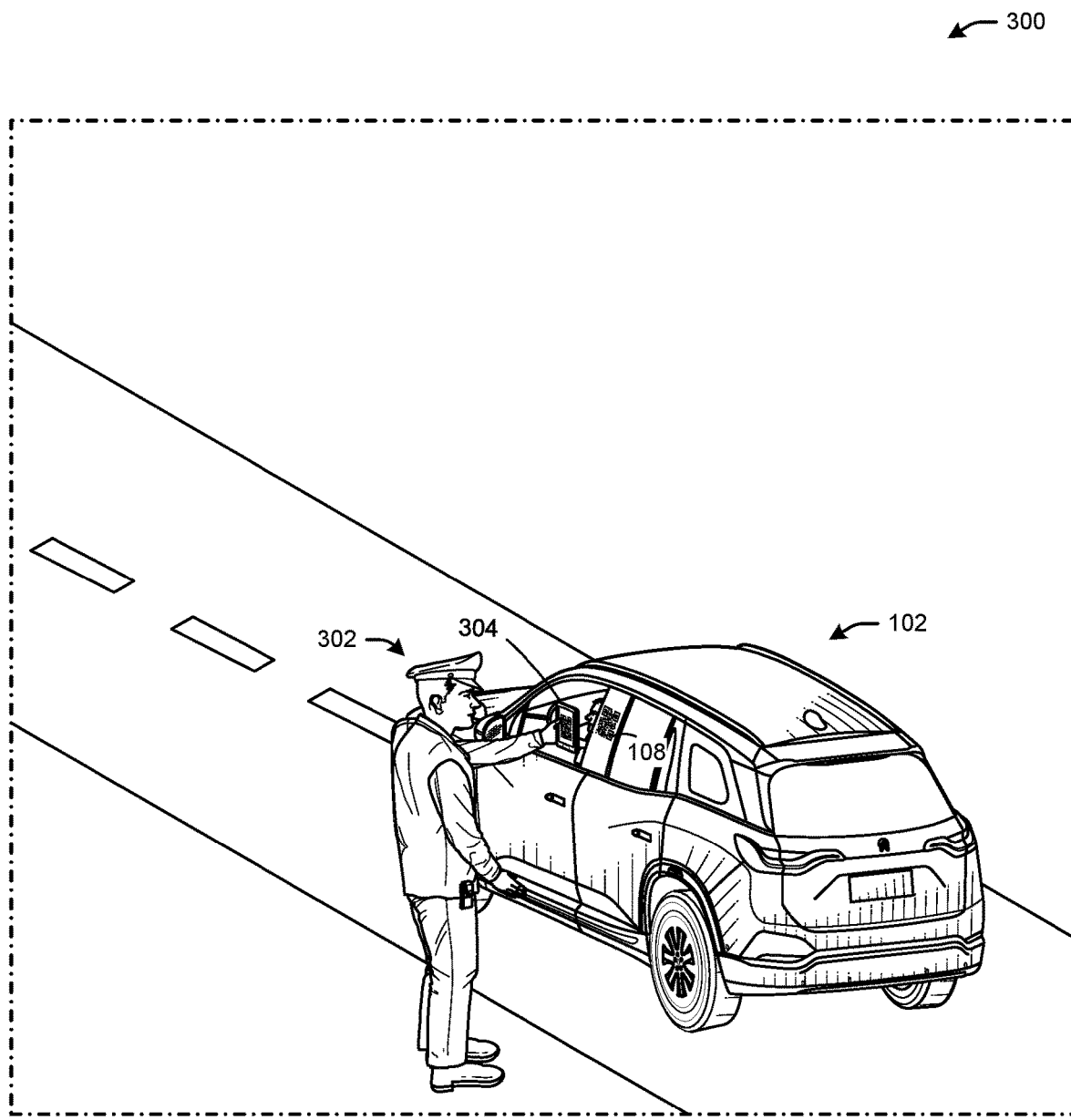
FIG. 3 depicts an illustrative vehicle code presentation system.

FIG. 3 depicts an illustrative vehicle code presentation system 300.

Referring to FIG. 3, the vehicle code presentation system 300 includes the vehicle 102 displaying the code 108 of FIG. 1, and a law enforcement officer 302 (or emergency response person) scanning the code 108 using a scanning device 304.

In one or more embodiments, the code 108 may include information relevant to a law enforcement stop, an emergency stop (e.g., a vehicle accident), or the like. The code 108 may be generated based on a selection of the activity or based on a detection of a vehicle accident. The information in the code 108 may include vehicle information (e.g., license plate, VIN, driver's license information such as driver's license number) and/or driver or passenger information (e.g., driver's license number, name, address, health information for emergencies, etc.), and the like. In this manner, when the law enforcement officer 302 approaches the vehicle 102, the law enforcement officer 302 may avoid any direct contact with the driver or passengers to obtain the information that is included in the code 108. In some embodiments, once the code 108 is scanned and verified, the vehicle 102 may, in accordance with relevant laws and policies, perform actions such as unlocking a door or the trunk, for example.

Figure 4:
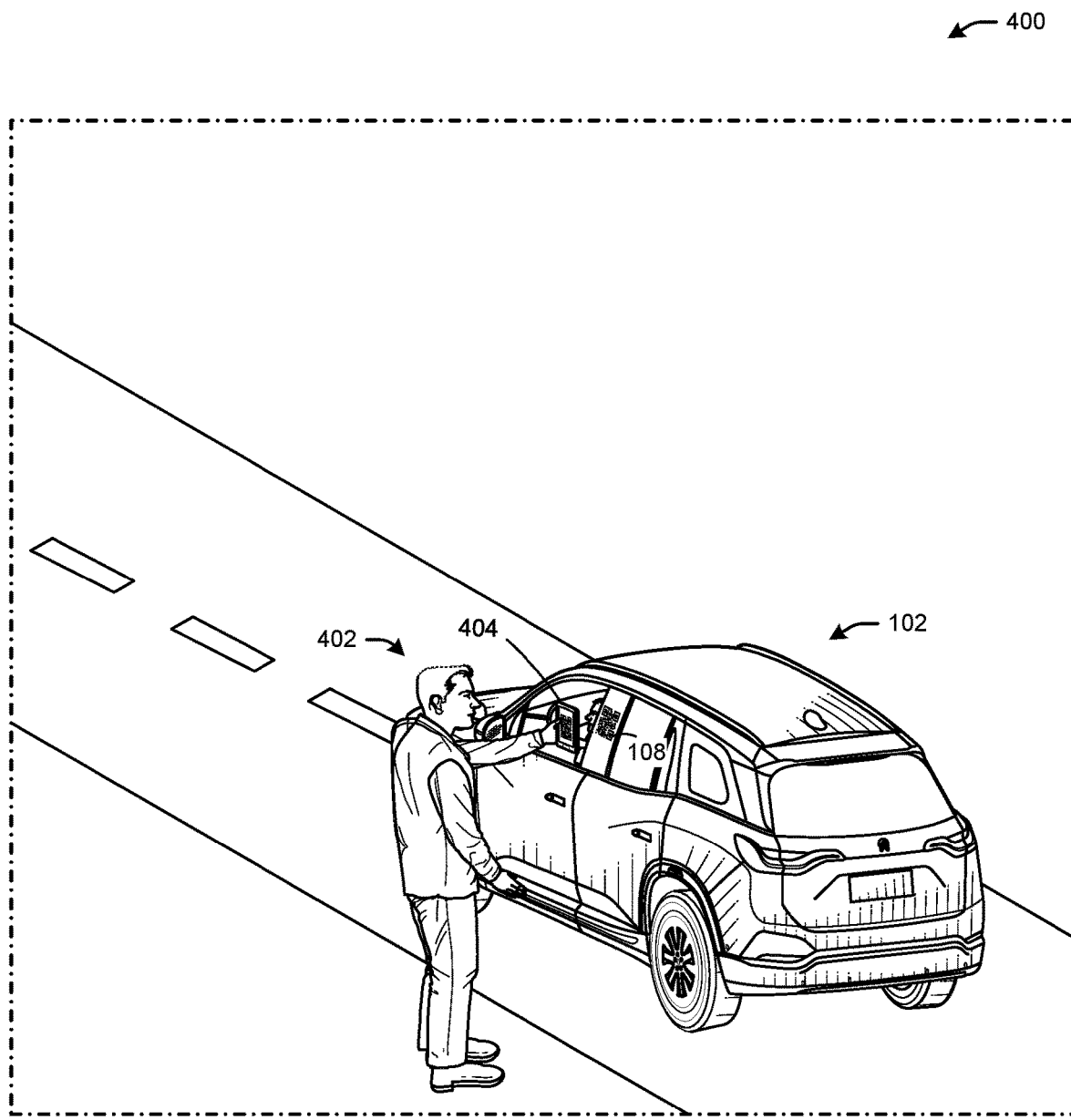
FIG. 4 depicts an illustrative vehicle code presentation system.

FIG. 4 depicts an illustrative vehicle code presentation system 400.

Referring to FIG. 4, the vehicle code presentation system 400 includes the vehicle 102 displaying the code 108 of FIG. 1, and a ride share passenger 402 scanning the code 108 using a scanning device 404.

In one or more embodiments, the code 108 may include information relevant to a ride share activity, such as an identifier for a driver or passenger (e.g., the ride share passenger 402), a transaction identifier, vehicle information (e.g., make, model, license plate, VIN, etc.) or the like, so that when the scanning device 404 scans the code 108, the information in the code 108 may be verified by the scanning device 404 (e.g., to verify the correct vehicle and/or driver).

In one or more embodiments, once the code 108 is scanned and verified, the vehicle 102 may, in accordance with relevant laws and policies, perform the actions such as unlocking a door to allow the ride share passenger 402 to enter the vehicle 102, for example.

Figure 5:
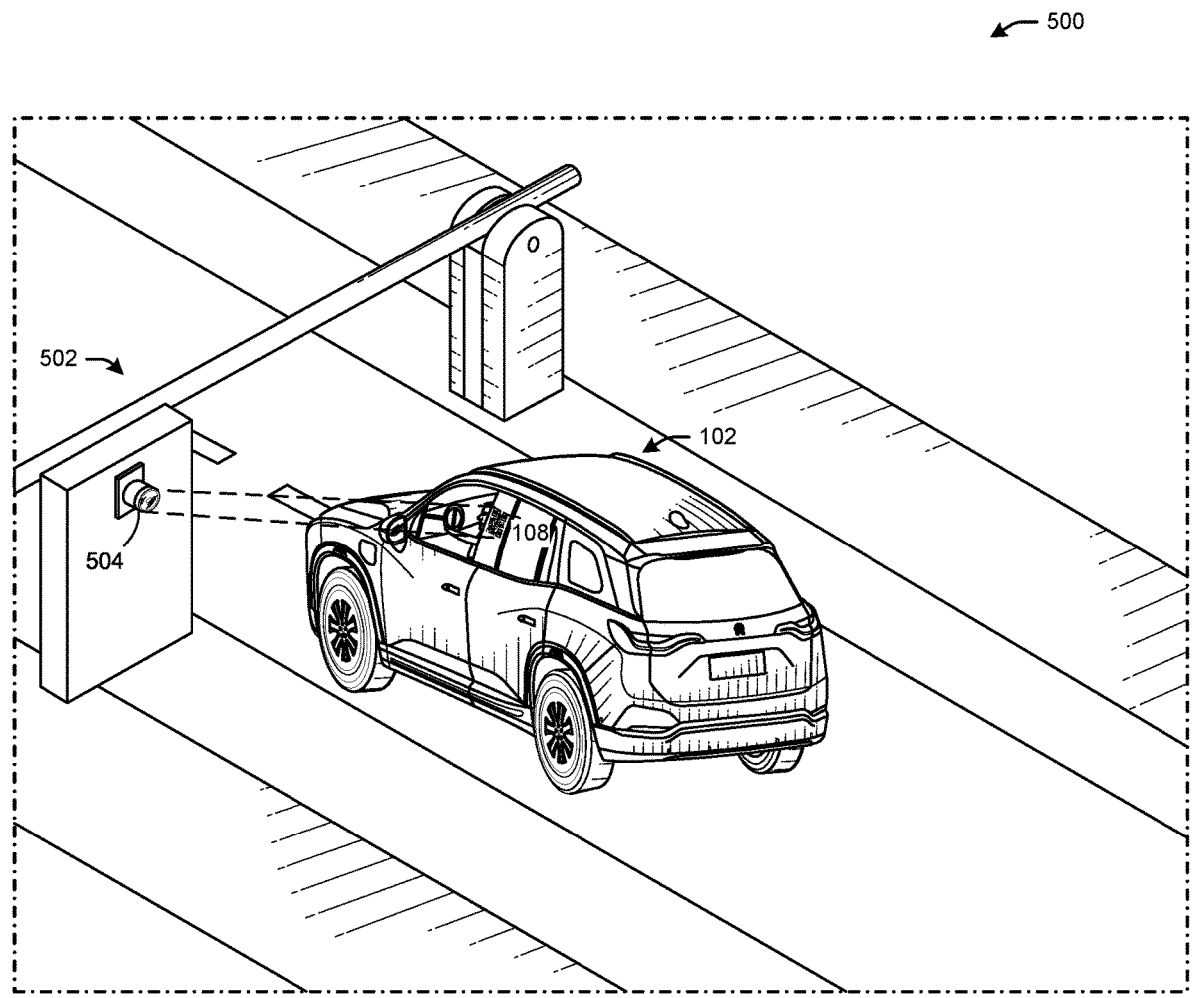
FIG. 5 depicts an illustrative vehicle code presentation system.

FIG. 5 depicts an illustrative vehicle code presentation system 500.

Referring to FIG. 5, the vehicle code presentation system 500 includes the vehicle 102 displaying the code 108 of FIG. 1, and a parking system 502 with a scanning device 504 capable of scanning the code 108. As the vehicle 102 approaches a parking lot, parking space, or the like, the scanning device 504 may scan the code 108. Because the code 108 may provide relevant parking information, such as a transaction identifier (e.g., if parking was pre-paid), license plate, VIN, vehicle make and model, or the like, the parking system 502 may determine whether to allow the vehicle 102 to enter a parking area, to begin tracking parking time for the vehicle 102, or the like.

In one or more embodiments, when the vehicle 102 exits the parking area, the vehicle 102 may display (e.g., using a display 602 as shown in FIG. 6) the duration of time that the vehicle 102 was parked and the price of the parking. The vehicle 102 may present an option to automatically pay the parking fee, and upon user selection, the payment may be made automatically (e.g., using a fee provided by the parking system 502 and payment information stored using the one or more devices 202 of FIG. 2). Similarly, the vehicle 102 may display options to extend parking time when pre-paid time expires, and user selection of a parking time extension may result in automatic and contactless payment.

FIG. 6 depicts an illustrative vehicle code selection system 600.

Referring to FIG. 6, a vehicle (e.g., the vehicle 102 of FIG. 1) may include a display 602 (e.g., a vehicle infotainment center or the like) with options for user selection and presentation of a code (e.g., the code 108 of FIG. 1). As shown, the display 602 may present a code generation option 604, and in response to a user selection (e.g., a touch, click, voice input, gesture, etc.) of the code generation option 604, may present options to generate codes based on a particular type of activity. For example, the code options may include a law enforcement code 606 (e.g., for a law enforcement activity such as a police stop or the like, such as the one shown in FIG. 3), a parking lot code 608 (e.g., for a parking activity such as the one shown in FIG. 5), a parking meter code 610 (e.g., for a parking activity such as the one shown in FIG. 5), a drive through code 612 (e.g., for a drive through/pick-up activity such as the one shown in FIG. 1), a ride sharing code 614 (e.g., for a ride sharing activity such as the one shown in FIG. 4), or the like. A selection of one of the code options may indicate one of the activities, and may cause the vehicle (e.g., the vehicle 102 of FIG. 1) to send a request for a code (e.g., to the one or more devices 202 of FIG. 2), the request including an indication of the activity to allow for generation of a corresponding code based on the activity. The vehicle may receive a code with information corresponding to the selection, and may present the code.

Figure 7:
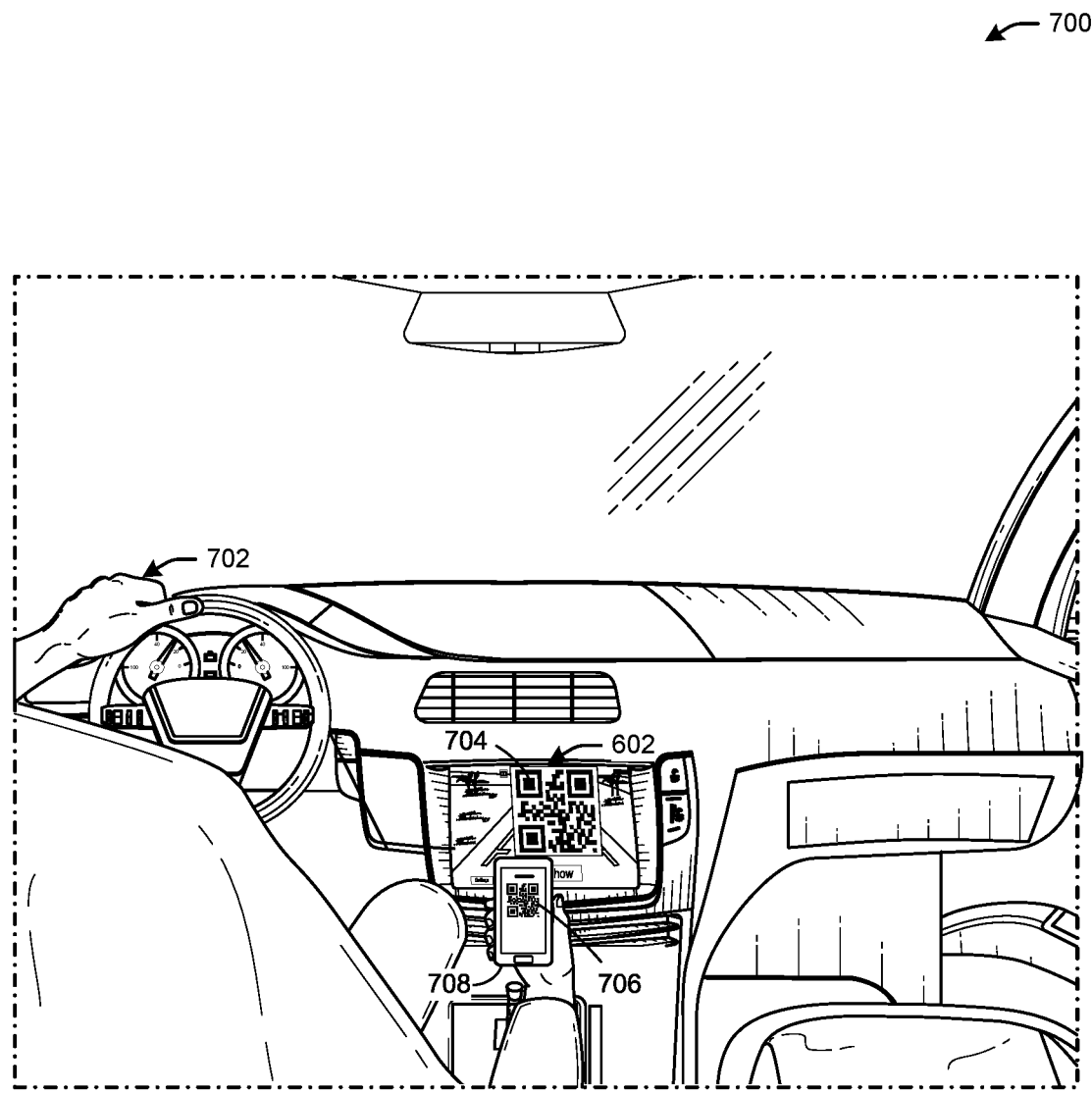
FIG. 7 depicts an illustrative vehicle code selection system.

FIG. 7 depicts an illustrative vehicle code selection system 700.

Referring to FIG. 7, after a user selection (e.g., by a user 702) of a code based on an activity type in FIG. 6, the display 602 may present the code that has been generated and received based on the activity (e.g., code 704, corresponding to the code 108 of FIG. 1). A corresponding code 706 may be presented on another device (e.g., user device 708), and may be presented on an exterior portion of a vehicle (e.g., the code 108 displayed on the vehicle 102 as shown in FIG. 1).

In one or more embodiments, the user 702 may use the user device 708 to execute an application with which to enter information to be stored for use in the code generation (e.g., stored using the one or more devices 202 of FIG. 2). For example, the user 702 may use the user device 708 to scan or otherwise enter a driver's license, payment card, license plate, VIN, transaction receipt, or the like. In this manner, when the user 702 selects a type of activity for code generation, the one or more devices 202 of FIG. 2 may receive a request to generate the code, and may use the stored information provided by the user 702 to generate and send the code to the vehicle 102 for presentation. The code 704 (and the code 108) may be presented for a temporary time (or until user input to stop presentation) and then removed, along with any of the information used to generate the code 704.

Figure 8A:
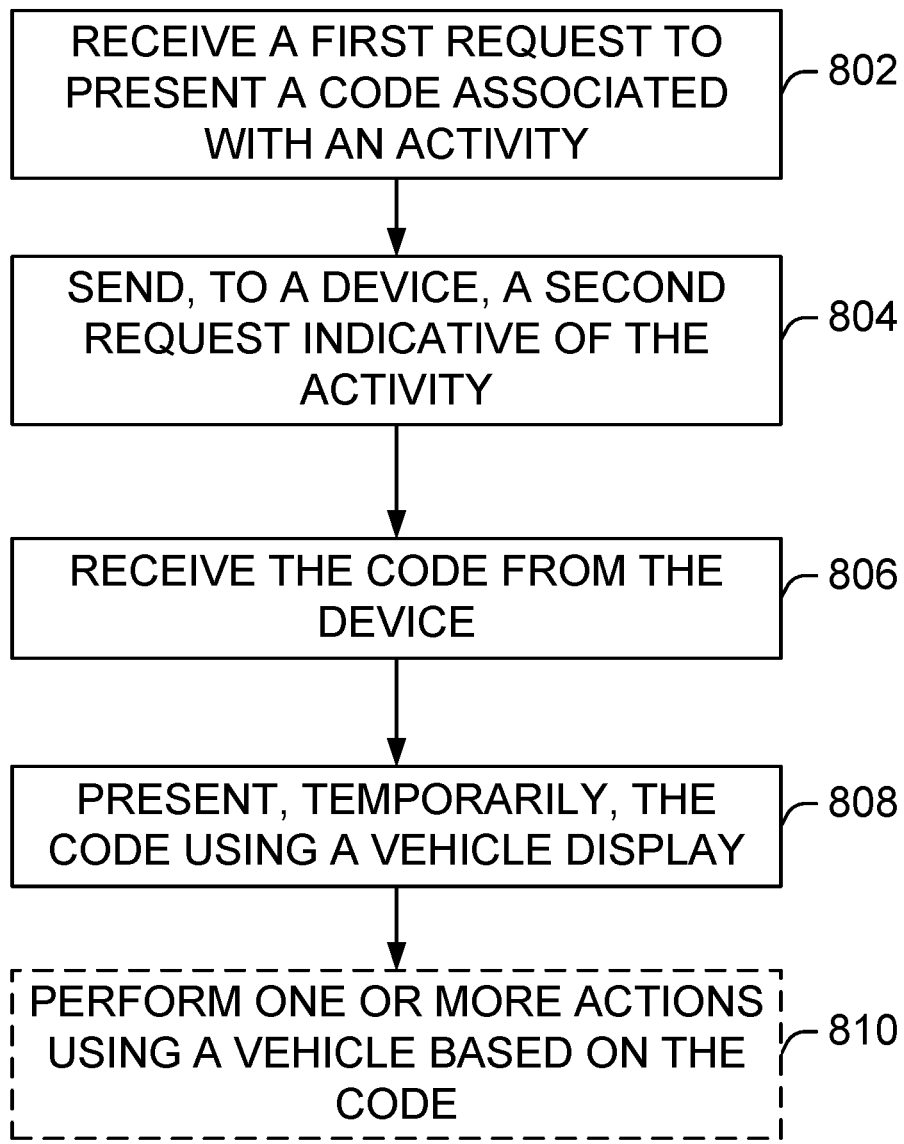
FIG. 8A is a flowchart of an example method for presenting vehicle codes.

FIG. 8A is a flowchart of an example method 800 for presenting vehicle codes.

Figure 9:
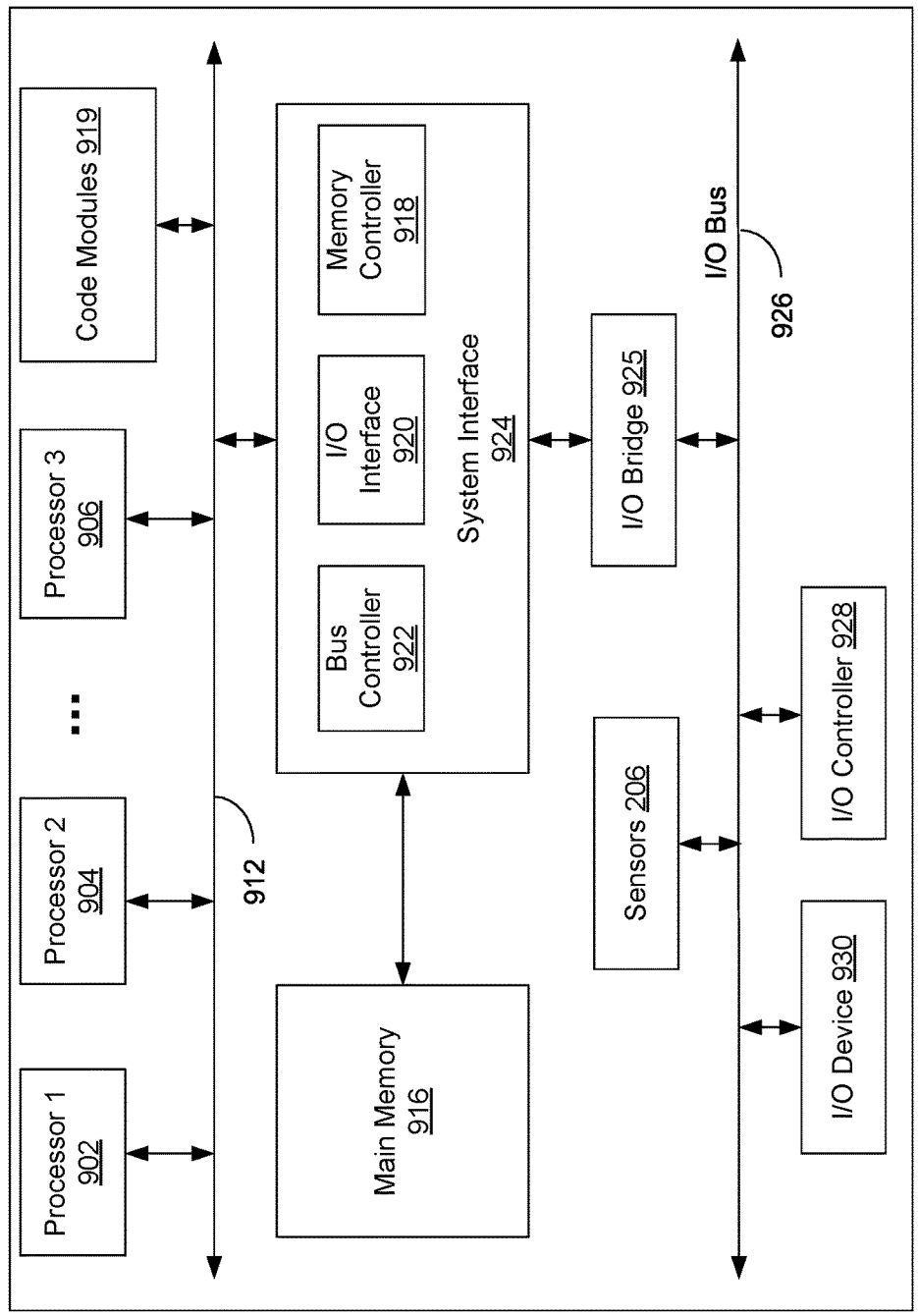
FIG. 9 is a block diagram illustrating an example of a computing device or computer system upon which any of one or more techniques (e.g., methods) may be performed, in accordance with one or more example embodiments of the present disclosure.

At block 802, a device (e.g., the vehicle 102) may receive a first request to present a code (e.g., a selection using the display 602 of FIG. 6) associated with an activity (e.g., parking, law enforcement, drive through/pick-up, ride sharing, etc.). Alternatively, the device may detect a vehicle accident (e.g., using sensors as shown in FIG. 9), and may generate and send the request, indicating that an emergency/accident may have occurred.

At block 804, the device may send a second request to a second device (e.g., the one or more devices 202 of FIG. 2) to generate a code. The request may include an indication of the type of activity to allow the second device to determine which information to include in the code. The second device may map the activity to the information and may generate the code to include the information. In this manner, the type of activity may indicate the type of code to generate and the information with which to generate the code.

At block 806, the device may receive the code from the second device, and at block 808, the device may present the code using a vehicle display (e.g., using the pillar 110 to present the code 108 as shown in FIGS. 1 and 2). The presentation of the code may be temporary to allow for the code to be scanned, and then the presentation of the code may be removed, and any information used to generate the code may be discarded from the device.

At block 810, the device optionally may perform one or more actions based on the presentation of the code. For example, once the code is scanned, a transaction may be made automatically, doors or the trunk of a vehicle that includes the device may be unlocked or opened, additional information may be presented using the device, and the like.

Figure 8B:
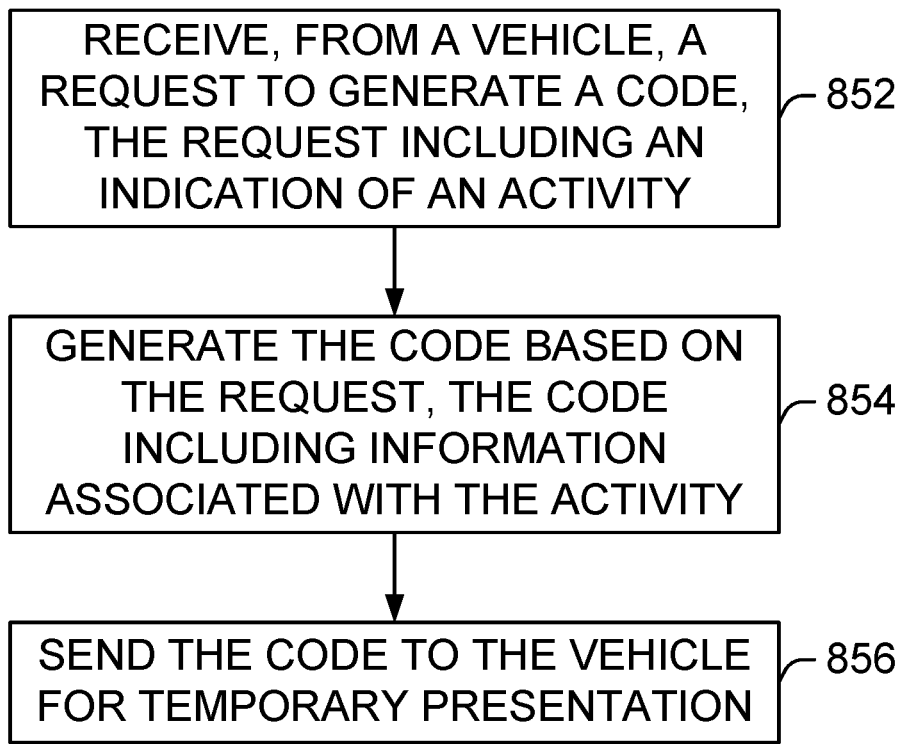
FIG. 8B is a flowchart of an example method for presenting vehicle codes.

FIG. 8B is a flowchart of an example method 850 for presenting vehicle codes.

At block 852, a device (e.g., the one or more devices 202 of FIG. 2) may receive, from a vehicle (e.g., the vehicle 102 of FIG. 1) a request to generate a code for the vehicle to present. The request may include an indication of an activity type (e.g., parking, law enforcement, emergency, ride sharing, drive through/pick-up, or the like).

At block 854, the device may generate the code (e.g., the code 108 of FIG. 1) based on the request. The device may map the activity to stored information to include in the code. For example, a law enforcement or emergency activity may map to information identifying a vehicle and/or person (e.g., based on a person's driver's license and/or vehicle registration). A parking activity may map to vehicle information (e.g., a license plate and/or vehicle identification number, payment information, etc.). A drive-through activity may map to transaction information (e.g., a purchase identifier or identifier of the purchaser). A ride share activity may map to information identifying a vehicle or person (e.g., a driver or passenger account). The device may generate a QR code using the information corresponding to the activity, or may generate another type of code (e.g., using NFC, ultrasound, etc.).

At block 856, the device may send the code to the vehicle to be presented temporarily (e.g., based on a time limit or until a user input indicates a request to stop presentation).

FIG. 9 is a block diagram illustrating an example of a computing device or computer system upon which any of one or more techniques (e.g., methods) may be performed, in accordance with one or more example embodiments of the present disclosure.

For example, the computing system 900 of FIG. 9 may include or represent the vehicle 102 of FIG. 1, and therefore may allow for the selection of activities, the requesting of codes corresponding to the activities, the receiving of codes, and the presentation of codes. The computer system (system) includes one or more processors 902-906. Processors 902-906 may include one or more internal levels of cache (not shown) and a bus controller (e.g., bus controller 922) or bus interface (e.g., I/O interface 920) unit to direct interaction with the processor bus 912. Code modules 919 may also be in communication with the processors 902-906 and may be connected to the processor bus 912. The code modules may allow for the presentation of activities and code options (e.g., FIG. 6), the requesting of codes, and the presentation of codes, such as by facilitating the processes shown in FIGS. 8A and 8B (e.g., the computing system 900 may be included in part or entirely by the one or more devices 202 of FIG. 2).

Processor bus 912, also known as the host bus or the front side bus, may be used to couple the processors 902-906, and the code modules 919 with the system interface 924. System interface 924 may be connected to the processor bus 912 to interface other components of the system 900 with the processor bus 912. For example, system interface 924 may include a memory controller 918 for interfacing a main memory 916 with the processor bus 912. The main memory 916 typically includes one or more memory cards and a control circuit (not shown). System interface 924 may also include an input/output (I/O) interface 920 to interface one or more I/O bridges 925 or I/O devices 930 with the processor bus 912. One or more I/O controllers and/or I/O devices may be connected with the I/O bus 926, such as I/O controller 928 and I/O device 930, as illustrated.

I/O device 930 may also include an input device (not shown), such as an alphanumeric input device, including alphanumeric and other keys for communicating information and/or command selections to the processors 902-506, and/or the code modules 919. Another type of user input device includes cursor control, such as a mouse, a trackball, or cursor direction keys for communicating direction information and command selections to the processors 902-906, and for controlling cursor movement on the display device.

System 900 may include a dynamic storage device, referred to as main memory 916, or a random access memory (RAM) or other computer-readable devices coupled to the processor bus 912 for storing information and instructions to be executed by the processors 902-906 and/or the code modules 919. Main memory 916 also may be used for storing temporary variables or other intermediate information during execution of instructions by the processors 902-906 and/or the code modules 919. System 900 may include read-only memory (ROM) and/or other static storage device coupled to the processor bus 912 for storing static information and instructions for the processors 902-906 and/or the code modules 919. The system outlined in FIG. 9 is but one possible example of a computer system that may employ or be configured in accordance with aspects of the present disclosure.

According to one embodiment, the above techniques may be performed by computer system 900 in response to processor 904 executing one or more sequences of one or more instructions contained in main memory 916. These instructions may be read into main memory 916 from another machine-readable medium, such as a storage device. Execution of the sequences of instructions contained in main memory 916 may cause processors 902-906 and/or the code modules 919 to perform the process steps described herein. In alternative embodiments, circuitry may be used in place of or in combination with the software instructions. Thus, embodiments of the present disclosure may include both hardware and software components.

According to one embodiment, the processors 902-906 may represent machine learning models. For example, the processors 902-906 may allow for neural networking and/or other machine learning techniques used to operate the vehicle 102 or the one or more devices 202.

In one or more embodiments, the computer system 900 may perform any of the steps of the processes described with respect to FIG. 8A and FIG. 8B.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, solid state devices (SSDs), and the like. The one or more memory devices (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 916, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   receiving, by at least one processor of a vehicle, a first request to present a first code associated with a first activity, wherein the first request is associated with a first user selection of a request for the first code associated with the first activity through a human-machine interface (HMI) of the vehicle;
   sending, by the at least one processor, a second request to a device, the second request indicative of the request for the first code associated with the first activity;
   receiving, by the at least one processor, from the device, the first code, wherein the first code comprises information associated with the first activity;
   presenting, by the at least one processor, using a display of the vehicle, the first code, wherein the display is external to the vehicle;
   receiving, by the at least one processor, a second request to present a second code associated with a second activity, wherein the second request is associated with a second user selection of a request for the second code associated with the second activity through the HMI of the vehicle;
   presenting, by the at least one processor, using the display of the vehicle, the second code;
   removing, based on a third user selection through the HMI of the vehicle, the presentation of the code from the display; and
   discarding the code.

2. The method of claim 1, wherein the first code is a quick response (QR) code.

3. The method of claim 1, wherein the first activity is associated with a purchase, and wherein the information comprises a transaction identifier.

4. The method of claim 1, wherein the first activity is associated with parking the vehicle, and wherein the information comprises a vehicle identifier.

5. The method of claim 1, wherein the first activity is associated with law enforcement, and wherein the information is based on a driver's license.

6. The method of claim 1, wherein the first activity is associated with an emergency responder, and wherein the information comprises a passenger name.

7. The method of claim 1, wherein the first activity is associated with a ride-sharing service, and wherein the information comprises a user identifier.

8. The method of claim 7, further comprising:
   receiving an indication of a third request to unlock a door of the vehicle, the third request based on the user identifier; and
   unlocking the door based on the third request.

9. The method of claim 1, wherein the display of the vehicle is operatively connected to an exterior pillar of the vehicle.

10. The method of claim 1, wherein the at least one processor is associated with an in-vehicle infotainment system.

* * * * *